United States Patent [19]
Russin

[11] 4,106,846
[45] Aug. 15, 1978

[54] TELEVISION COLOR BAR MATCHING DEVICE

[76] Inventor: Morton S. Russin, 32 Windmill La., New City, N.Y. 10956

[21] Appl. No.: 741,563

[22] Filed: Nov. 15, 1976

[51] Int. Cl.² ............................................. H04N 9/62
[52] U.S. Cl. ..................................................... 358/10
[58] Field of Search .............................. 358/10, 28, 54

[56] References Cited
U.S. PATENT DOCUMENTS

| 2,854,505 | 9/1958 | Davis | 358/10 |
| 2,931,856 | 4/1960 | Davis et al. | 358/10 |

Primary Examiner—John C. Martin
Attorney, Agent, or Firm—Philip Furgang

[57] ABSTRACT

Disclosed is a color bar mask for adjusting television receivers of the type used in closed circuit systems. The mask comprises a plurality of vertical colored translucent bars spaced between opaque bars. The bars are dimensioned so as to match up with color bar signals generated upon the screen of the receiver. The mask is designed to leave a substantial part of the screen exposed so that the bar signals generated on the screen can be compared with the same bars as viewed through the translucent color bar pattern. The mask is secured to a frame. The frame is pivotally secured to a rectangular member which rests on the receiver so that the mask may be conveniently disposed and removed from the screen.

9 Claims, 5 Drawing Figures

TELEVISION COLOR BAR MATCHING DEVICE

BACKGROUND OF THE INVENTION

This invention relates to tools used in adjusting the color balance on a color television receiver and, more particularly, the color bar pattern matching devices.

The reproduction of accurate color balance upon a color television receiver is a desirable feature. Color balance or accurate color reproduction becomes a necessity in closed circuit commercial television systems. For example, physicians need precise color reproduction in order to make accurate evaluation. Numerous other instances in which accurate color reproduction in closed circuit systems can be easily imagined. In settings where the cost of maintenance can be critical, as in hospitals and research facilities, it is also important that the devices used to adjust a color receiver and/or monitor be economical. If such devices enable someone who is not a trained service person to make the adjustments, the device is of even more importance.

Until now, it was believed that a device which is both economical and so easy to use that a trained technician is not required was not available. Color adjustments may be made by displaying predetermined color patterns on the receiver and/or monitor screen. Frequently, these color patterns take the form of horizontal color bars having a predetermined color pattern. The thickness of each color bar pattern is also of predetermined dimensions for each size television screen.

The color bar pattern may be generated by a color bar generator. However, in closed circuit systems, the pattern is frequently provided by a prerecorded magnetic tape.

One device for use of adjusting color on a receiver comprises a cardboard card, upon which the colors are printed in opaque inks. The technician adjusts the receiver by comparing the displayed color against the hand-held card. This device requires that the colors on the cards be accurately printed and that the dyes will not fade over a period of time. Obviously, these factors of time and the exposure of the card to ambient light will render the card inaccurate within a very short time.

Another device has been suggested by Davis et al., in U.S. Pat. No. 2,931,856. Davis et al. provides a series of translucent color bars to be placed over the entire screen of a television receiver. The receiver must have, surrounding the screen, a light which provides proper color temperature illumination for that portion of the mask which is outside the screen area. A color bar pattern is then generated upon the screen and viewed through the translucent bars. The illuminated color is matched against the color bars displayed on the screen, as viewed through the mask. When the colors are matched, Davis et al. suggests that the color receiver has been accurately adjusted. However, this device has a number of serious disadvantages. First of all, in order to be operative, the television receiver must be provided with a light immediately adjacent the screen and so disposed as to illuminate the mask from behind. It is believed that such receivers are no longer available. Most important, however, is the fact that this device requires that the color bars on the screen be matched with the color bars of the surrounding lighting element. If the color of the lighting element is somewhat distorted (i.e., is not a pure white light), the compared colors will be inaccurate, in the same way as if someone held up a card of pre-printed colors and compared it against the screen and attempted to align the color bars displayed on the TV receiver with that on the preprinted card. Further, as the surrounding lighting element ages, it is well known that its color temperature changes, as well.

SUMMARY OF THE INVENTION

It is, therefore, an object of this invention to provide a color bar matching device which may be aligned with a color bar pattern on a television receiver, so that the colors generated on the screen may be compared simultaneously as viewed through the device and directly on the screen.

It is a further object of this invention to provide a color bar matching device which is simple in construction, economical in manufacture, and simple in use.

In accordance with the teachings of this invention, there is provided a device for adjusting color television receivers, wherein such a receiver is of the type used in a system which provides upon the receiver's screen a predetermined pattern of predetermined dimension. The television receiver may be, for example, of the type employed in the closed circuit television systems, in which a color bar pattern is generated upon the screen for the purposes of adjusting the color reproduction accuracy of the receiver. The device comprises a housing and a mask. The mask comprises a plurality of translucent colored segment for being disposed in front of the screen. The segments are dimensioned to conform to the pattern generated upon the screen and, simultaneously, to leave a portion of the generated pattern exposed, such that the color pattern can be compared with itself as viewed through the segments and the unobstructed pattern upon the screen.

DESCRIPTION OF PREFERRED EMBODIMENTS

Figure 1:
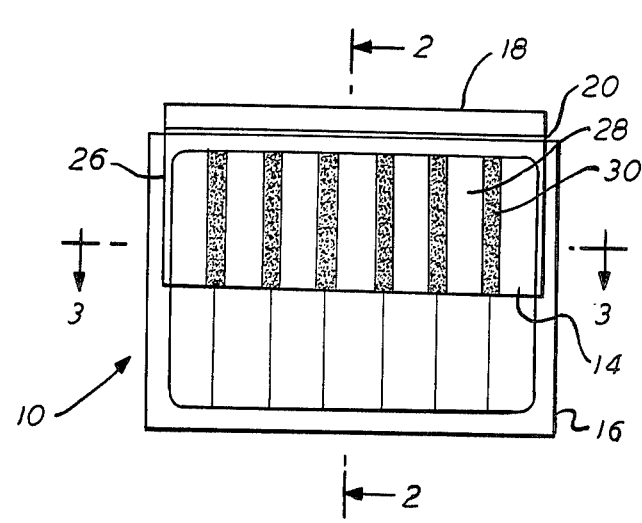
FIG. 1 is a front view of a color bar matching device, disposed upon the front of a television receiver.

As indicated above, the prior art has many disadvantages. In one device, colors are printed upon a sheet of paper or cardboard. This card is hand held against the screen to match it against the generated color bar pattern. The dyes on the printed card are subject to change, due to the effects of time and the type of light to which they are exposed. Further, reflected light off the card will also change the color bars. The other method is to cover the entire screen with a translucent sheet of color bars. The portion of the color bars that extends beyond the screen is illuminated by a colorless light. The lighting surrounding the picture tube which illuminates the mask provides the reference colors against which the color bars, as generated upon the television screen, are compared. It is obvious that, as the colorless light ages, the light emitted will, itself, change color. The result will be that the color between the reference and the screen will change with time and the accuracy with which the receiver reproduces color will vary. The device of this invention provides for self comparison, avoiding all the disadvantages of the prior art.

The device in this invention is particularly adaptable to closed circuit systems, such as is used in hospitals or the like, in which color bars are disposed upon the screen by transmission of appropriate signals through the closed circuit system, as is well known. Usually, such a system includes a color bar pattern generated from a tape deck. While particularly appropriate for such systems, the device of this invention will be understood to be equally applicable to standard color television receivers used by the general public.

Color bar patterns which are displayed on television receivers have been standardized, so that each color bar pattern is identical, no matter who the manufacturer of the television receiver is or who provides the equipment for generating the pattern. Thus, the color bar pattern generated is a plurality of vertical stripes which, proceeding from left to right, comprise the colors white, yellow, cyan, green, magenta, red, and blue. In addition, it is also well known that the spacing of color bar patterns upon a screen is also standardized for the particular size screen of each television receiver. Thus, all patterns displayed on a television receiver screen which measures 25 inches diagonally will have a color bar pattern in vertical stripes, proceeding from left to right across the screen, having a predetermined dimension of width which will be substantially identical on all 25 inch sets. If the television screen were 19 inches measured diagonally, the color bar pattern would have the same identical color bar pattern proceeding from left to right. However, the width of each strip or bar would be different from the 25 inch diagonally measured screen.

Turning to the drawing, there is provided a masking device 10 which generally comprises a housing 12 and a mask 14. As disclosed (FIGS. 1 and 2), the masking device 10 is shown disposed upon a television receiver 16. (Similar numbers are used throughout this specification to indicate identical items.)

Figure 2:
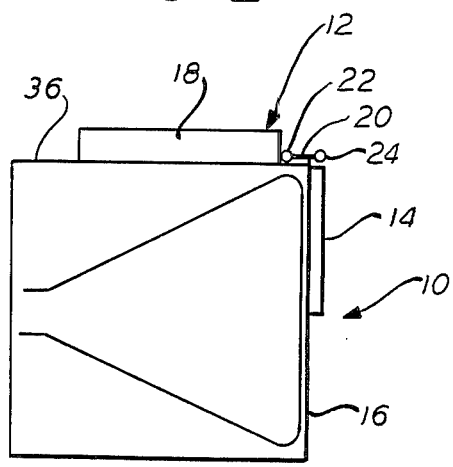
FIG. 2 is a schematic cross section of the television set of FIG. 1, taking along the lines 2—2.

More particularly, the housing 12 may preferably comprise a rigid member of generally rectangular shape 18, made of plastic, metal, or the like. Secured to the rectangular member 18 may be a flange 20 (FIG. 1). The flange 20 may be pivotally secured to the rectangular member 18 as by a hinge 22 or the like. The hinge 22 may be made of any plastic or metallic material or any other well-known material commonly known in the art. The flange 20 may be of any rigid material such as plastic, metal, or the like. The flange 20 should have a generally rectangular shape extending along the length of the rectangular member 18. Hingedly joined to the flange 20, as by another hinge 24, may be a frame 26. The frame 26 may have a generally rectangular shape. The second hinge 24 may be made of the same material as the first hinge 22. The mask 14 presents a pattern of translucent colored plastic strips arranged in vertical stripes so as to correspond to the predetermined pattern which is displayed on a typical color receiver 16. The stripes 28 may be separated by opaque stripes 30.

Figure 3:
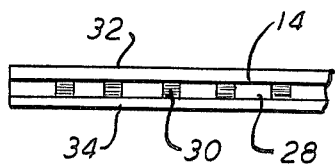
FIG. 3 is a partial cross sectional view of the mask of FIG. 1.

One preferred method of construction of the mask 14 (FIG. 3) is to provide colored translucent strips 28, disposed in a side-by-side relationship in the predetermined pattern. These strips 28 may be in the form of colored gels, as is well known in the art. Each strip 28 would be secured to one another by an opaque tape 30, which may be, for example, any black masking tape or electrical tape or any plastic opaque material. The tape 30 thus serves the dual function of providing an opaque separation between the gels 28 and securing one to the other. Thus, the combination of the tape 30 and the translucent colored strips 28 provide the pattern of opaque and colored horizontal bars. This combination may be held securely in place by a sandwich of two colorless, translucent, plastic sheets 32 and 34. The combination, which thereby forms the mask 14, is then set in the frame 26 and may be secured as by joining by heat, glue, or the like. As indicated, the housing 12 may be made of any rigid material, such as plastic, metal, or the like. The rectangular member 18 may be disposed on the top surface 36 of the television receiver 16, such that the mask 14 is aligned across the screen of the set. For each size screen 38, it will be necessary to have a mask 14 of appropriate dimensions to conform to the dimensions thereof. It is essential that the mask 14, as disposed across the screen 38, be so dimensioned that a substantial portion of the screen 38 is exposed. This is an essential part of this invention. As previously indicated, the dimensions of the vertical bars generated on the screen are predetermined by standards well known in the industry. These dimensions are similarly provided in the mask 14.

With the masking device 10 in place, the flange 20 rests on the top surface 36 of the television receiver 16. When the color bar pattern is generated on the screen 38, if the color bar pattern is identical to that of the mask 14, there will be no difference in the color as viewed simultaneously through the mask 14 and on the screen 38. If there is a difference in the color, the interference between the color frequencies as they pass through the gels 28 will cause an aberration or a different color to be seen, when compared to the unmasked portion of the screen 38. The user of the set may, thereafter, merely adjust the appropriate balancing controls of the receiver 16 until the colors match. No specific engineering or technical background is required to make these adjustments, as has been heretofore necessary. Essentially different from all of the prior art devices, and very important to this device, is the fact that the colors are being compared through the translucent gel 28 to the pattern directly on the screen 38. When not in use, the housing 12 may be left in place on the television receiver 16. The flange 20 may be moved pivotally upward and is so dimensioned that it permits the mask 14 to be folded along the hinge 24 and across the top 40 of the rectangular member 18.

Figure 4:
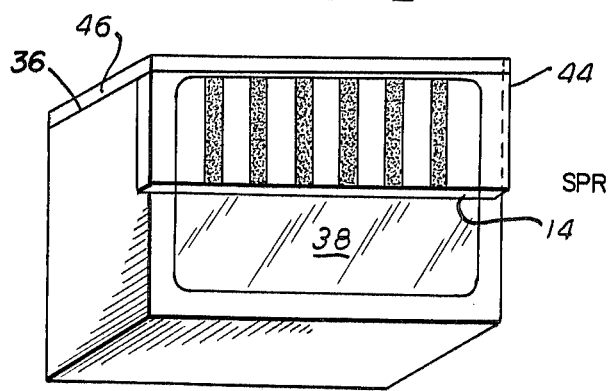
FIG. 4 is a front view of another mask constructed in accordance with the teachings of this invention and disposed upon a television receiver.

An alternative embodiment provides the mask 14 set in a rigid frame 44 (FIG. 4), which may have a generally "L" shaped configuration, with one leg of the "L" 46 disposed across the top 36 of the receiver 16 and the other leg 48 disposed parallel to the plane defined by the screen 38.

Figure 5:
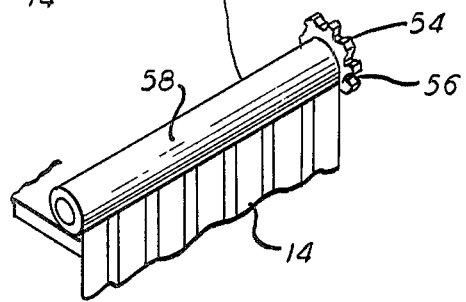
FIG. 5 is a partial sectional perspective view of another mask constructed in accordance with the teachings of this invention.

The screen 14 may be disposed on a roller 54 (FIG. 5). The roller 54 may have a knurled knob 56 disposed at one side. The roller 54 may be disposed in a cylindrical case 58. When not in use, the mask 14 may be rolled up upon the roller 54 and into the case 58. In the alternative, it is also within the comprehension of this device that the mask 14 may be placed upon a roller (not shown) which is spring-loaded in the same manner as a window shade.

It is to be understood that, as used herein, the color bar patterns referred to may be understood to include any color pattern displayed upon a screen for the adjustment of the receiver.

What is claimed is:

1. A device for adjusting color television receivers wherein such receivers are used in cooperation with a system which provides, upon the screen of the receiver, a predetermined colored pattern of predetermined dimensions, the device comprising:

a housing; and a mask, in combination with said housing, said mask comprises a plurality of translucent colored segments secured to said housing for being disposed over said screen, said segments being dimensioned so as to conform to at least a part of the predetermined pattern and to, simultaneously, leave a portion of the generated pattern uncovered by said mask, such that the color pattern can be compared with itself as viewed through said segments and upon the screen.

2. A device as recited in claim 1, wherein said segments being disposed in parallel, vertical bars.

3. A device as recited in claim 2, wherein said segments comprise a substantially rectangular configuration having substantially the same dimensions of the width of the receiver screen and being substantially shorter than the height of the screen.

4. A device as recited in claim 3, wherein said segments comprise a plurality of translucent colored gels secured to one another by horizontally disposed opaque strips, thereby forming a pattern of colored translucent bars separated by opaque bars.

5. A device as recited in claim 4, wherein said mask further comprises a sandwich of colorless translucent material on either side of said strips, said opaque strips comprising adhesive tape.

6. A device as recited in claim 5, wherein said mask being hingedly joined to said housing, said housing comprising a rigid member for being removably disposed upon the top surface of the receiver, such that said mask may be moved pivotally upward and upon said housing and away from the screen when not in use.

7. A device as recited in claim 5, wherein said mask being rigidly secured to said housing, said housing having a generally "L" shape, such that one leg of said "L" is for being disposed upon the top surface of the receiver, the other leg of said "L" having therein said mask for being disposed over only a part of the screen.

8. A device as recited in claim 5, wherein said housing comprises a roller and a rigid cover, said roller being rotatably secured within said cover, said mask being secured to said roller for being wrapped about said roller for storage within said cover.

9. A device as recited in claim 8, wherein said roller being a spring loaded shade roller and said mask being wound upon said roller.

* * * * *